March 14, 1967  R. L. COLECHIA  3,308,649
FLUID CONTAMINATION ANALYZER
Filed Dec. 23, 1963  3 Sheets-Sheet 1

INVENTOR.
RAYMOND L. COLECHIA
BY Robert B. Harmon
ATTORNEY

March 14, 1967 R. L. COLECHIA 3,308,649
FLUID CONTAMINATION ANALYZER
Filed Dec. 23, 1963 3 Sheets-Sheet 3

INVENTOR.
RAYMOND L. COLECHIA
BY Robert B. Harmon
ATTORNEY

United States Patent Office 3,308,649
Patented Mar. 14, 1967

3,308,649
FLUID CONTAMINATION ANALYZER
Raymond L. Colechia, Mystic, Conn., assignor to General Dynamics Corporation, New York, N.Y., a corporation of Delaware
Filed Dec. 23, 1963, Ser. No. 334,079
5 Claims. (Cl. 73—61)

The present invention relates in general to semi-automatic fluid analyzers and more particularly to a semi-automatic device for determining contamination levels of any fluid by means of on-the-spot particle analysis techniques in a sealed instrument, independent of laboratory facilities.

Problems created by the demands of the type of instrument under discussion have been numerous and include, for example, the need for a compact and self-contained instrument which may be taken from location to location independent of stationary laboratory apparatus. Other problems include performing the various steps in the flushing and testing cycles in an environment sealed from the atmosphere, providing suitable apparatus to adapt the testing unit to draw samples from closed fluid systems, and providing apparatus for drawing atmospheric air samples or air samples from fabricated pneumatic systems. The prior art has not provided a suitable compact unit for answering these needs and the present invention therefore constitutes a substantial advance over known prior art devices of the same general character.

The present invention therefore has for its primary object the presentation of a highly sensitive, efficient and reliable contamination analyzer which can be utilized for contamination analysis of fluids independent of laboratory facilities.

Another object of the present invention is to provide a sealed unit capable of being installed as part of a fluid system or functioning as a self-contained portable unit.

A further object of the present invention is the provision of a contamination analyzer suitable for analysis of all types of fluids such as air, oil, water, etc.

A further object of the present invention is the provision of a contamination analyzer having selective automatic cycles including a system flush cycle, an indexing cycle, air or liquid sampling cycles and an analysis cycle.

A still further object of the present invention is the presentation of a semi-automatic fluid analyzer wherein the analysis is accomplished by filtering methods with provision being made for storage and preservation of contamination samples.

The means by which the foregoing objects and other advantages which will be apparent to those skilled in the art, are accomplished, are set forth in the following specification and claims and are illustrated in the accompanying drawings dealing with a preferred embodiment.

Reference is now made to the accompanying drawings in which.

Referring now to the drawings, wherein like reference numerals are used to indicate identical parts in the various views, the overall system will be described with special reference to FIGURE 1.

Figure 1:
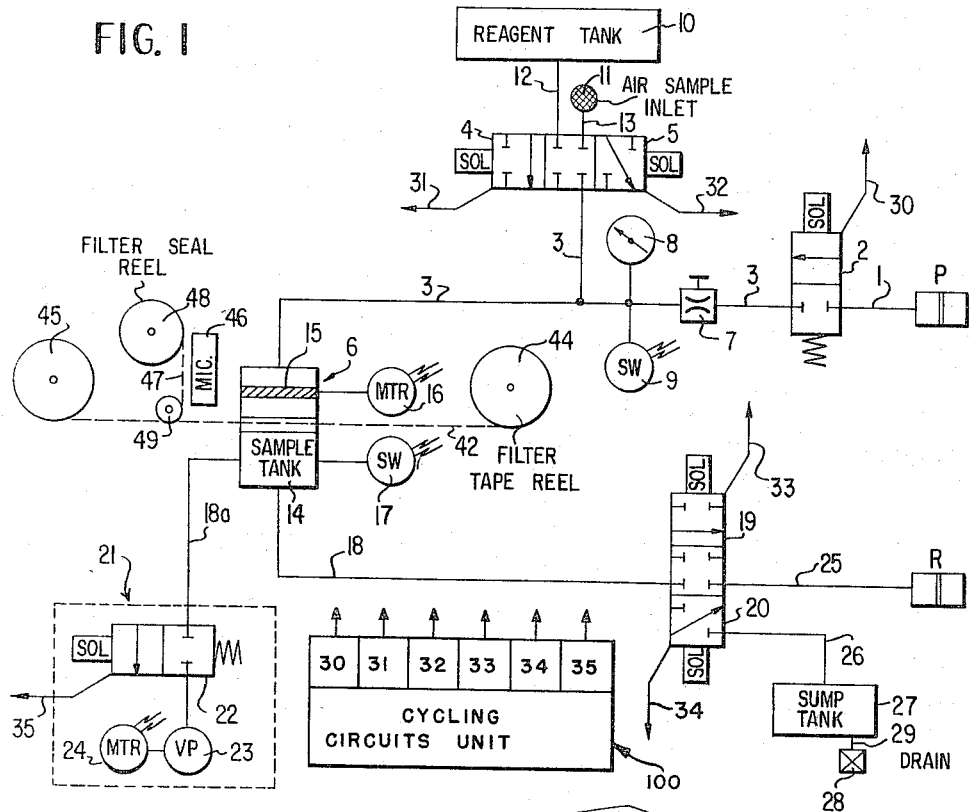
FIGURE 1 is a schematic illustration of the overall system of the present invention.

The system comprises a fluid inlet pressure header connection P suitable for connection to a fluid line containing the fluid to be analyzed. A conduit 1 connects the inlet header P to a two-way solenoid valve 2 which, in turn, is connected by a suitable conduit 3 to solenoid valves 4 and 5 and sample chamber assembly 6. A manually operated control valve 7 is located in the conduit 3 to provide a means for regulating the flow and the fluid pressure within the analyzer system. Also for the protection of the analyzer system, a visual pressure gauge 8 is located in conduit 3 so that an operator may keep a visual check on the internal pressure within the system. A pressure operated switch 9 provides a safety measure for protecting the instrument from high pressure and is utilized to de-energize the system components including the solenoid valves in the event of an occurrence of pressure above a preset limit. The details of the electrical circuits for controlling the various components such as the solenoid valves, motors and switches are not illustrated since such circuits are well known in the prior art and only utilization of conventional circuits is anticipated.

Through the solenoid valves 4 and 5, the conduit 3 may be selectively connected with a reagent tank 10 or with an air sample inlet 11 by their associated conduits 12 and 13 respectively. In the alternative, both the reagent tank and the air sample inlet may be disconnected from the conduit 3 by operation of the solenoid valves.

The sample chamber assembly, indicated generally at 6, comprises a sample tank 14, a movable sealing member 15 and a motor 16 for controlling the position of the movable sealing element 15.

The sample tank 14 is equipped with a liquid level control switch 17, the purpose of which will be explained in connection with the operation of the system. The sample tank 14 is also connected by means of conduit 18 to solenoid valves 19 and 20.

The valve and pump assembly 21 comprises a two-way solenoid valve 22, which selectively connects the sample tank 14 with the vacuum pump 23 through the conduit 18a. An electric motor 24 is provided in the assembly 21 for driving the pump 23.

Solenoid valve 19 may be operated to selectively connect and disconnect the conduit 18 with the return conduit 25 which is in turn connected to the return header connector R. The connector R will be utilized when the system is connected in line with a pressurized closed fluid system.

The solenoid valve 20 may be operated to selectively connect the conduit 18 to a discharge conduit 26 leading to a suitable sump tank 27 which may be connected to a suitable drain fitting 28 by conduit 29.

As previously mentioned, the solenoid valves are connected to conventional timed cycling circuits, constituting a cycling circuit unit 100, which also include the other electrical components of the system and which may be set by suitable manual switches so as to initiate an automatic cycle of operations. This type of cycling circuitry is widely utilized in the control of automatic washers and dryers and a multitude of other household appliances. The present invention isc not directed to the details of any specific cycling circuit and hence the details of such circuits are not necessary to the understanding of the present invention. The particular sequence of the functions or operations of the valves and electrical components will be described later in connection with the operation of the analyzer system.

The cycling circuits of the unit 100 have been represented diagrammatically in FIGURE 1 and will be understood to be complete electrical circuits. The solenoid valve 2 is connected to a suitable control circuit 30, the valve 4 is connected to circuit 31 and valve 5 is connected to circuit 32. Likewise solenoid valves 19, 20 and 22 are connected to control circuits 33, 34 and 35 respectively. Manual control for the various cycles to be described is provided by the switches 36, 37, 38, 39, 40 and 41 located on the front cover of the analyzer unit and illustrated in FIGS. 2 and 5. The switches may comprise conventional rotary switches or push button switches which are selectively operated by the operator of the unit.

To complete the system, referring to FIG. 1, a filter tape 42, which has spaced individual filter pads incorporated thereon, is designed to pass between the sealing element 15 and the sample tank 14. The details of the filter tape are shown more clearly in FIG. 2 wherein the individual filter pads 43 are illustrated along the length thereof. The filter tape 42 is fed from a supply reel 44 and is taken up on a similar take-up reel 45. The take-up reel 45 may be operated by any suitable indexing motor, not shown, which is designed to advance the filter tape the distance between centers of the filter pads upon energization by a suitable cycling circuit to be described. A microscope 46 of a conventional design is positioned to one side of the sample chamber assembly so as to be in position for viewing a filter pad as the pad is indexed from a position within the sample chamber assembly to the microscope location.

Also associated with the filter tape mechanism is a filter seal web 47 carried by the reel 48. The web 47 will be guided onto the top of the filter tape 42 by means of a guide roller 49 so as to act as a seal between the layers of filter tape as they are wound upon the take-up reel 45.

The manner in which the various components of the system described in FIGURE 1 are assembled in a compact analyzer unit is shown in detail in FIGS. 2 through 5. The various components of the system described with relation to FIGURE 1 bear the same reference numerals in FIGS. 2 through 5.

Figure 2:
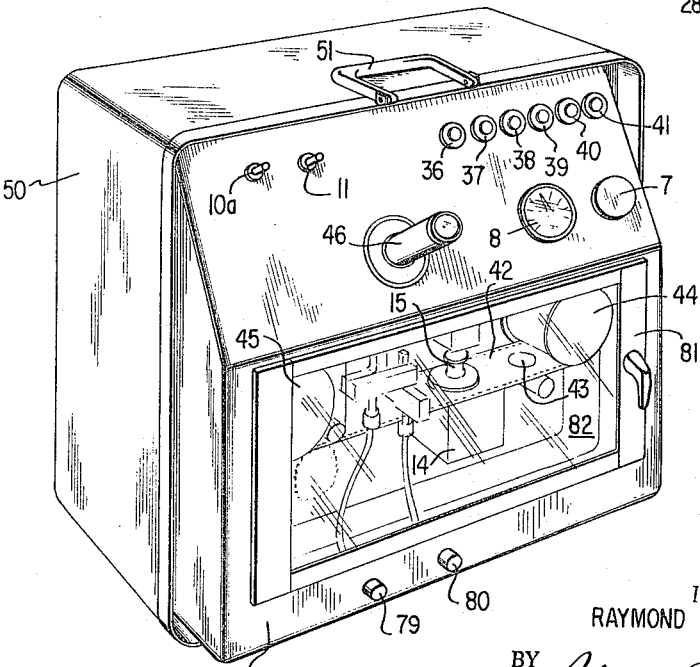
FIG. 2 is a perspective view of the present invention embodying the system illustrated in FIGURE 1.
Figure 3:
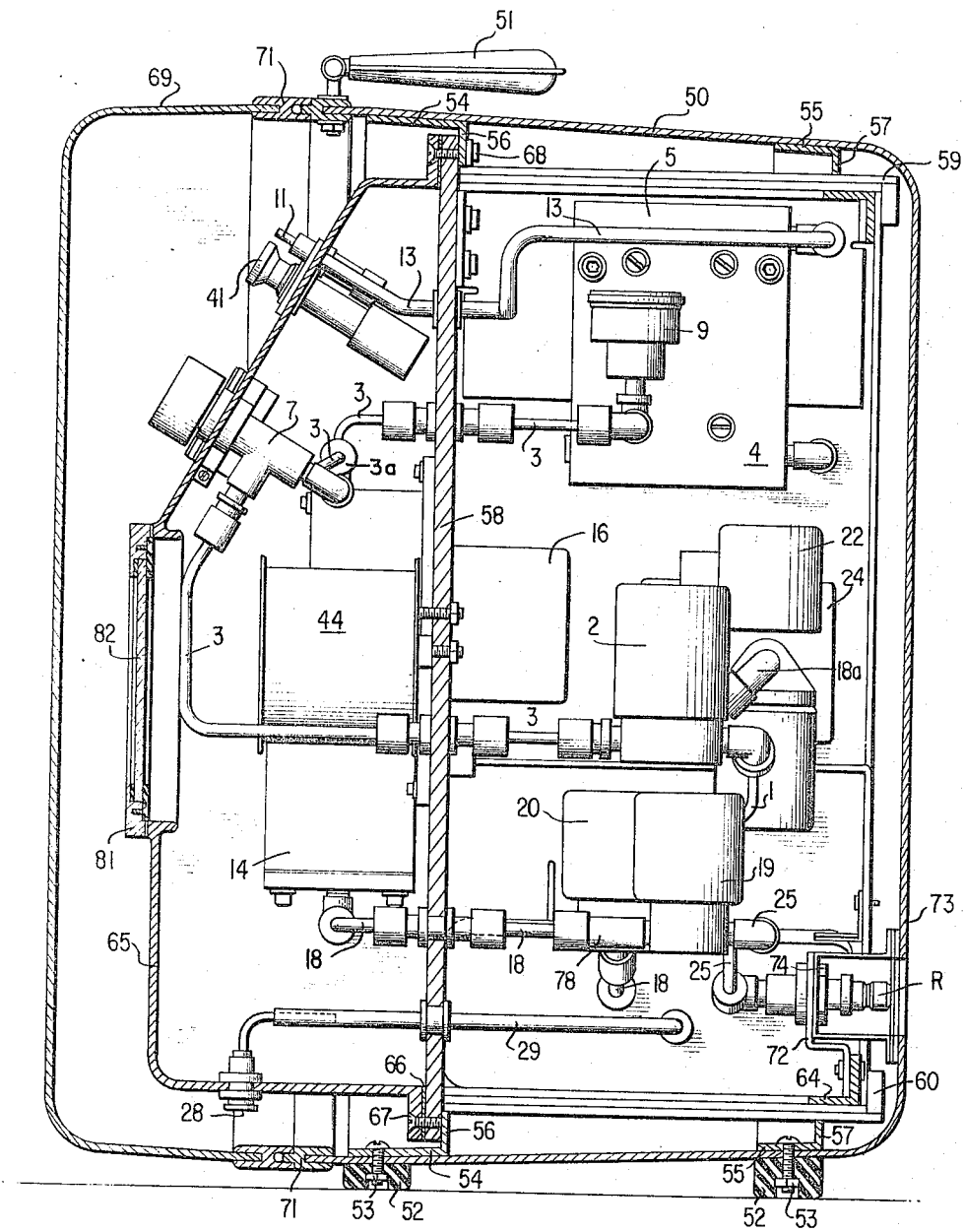
FIG. 3 is a side elevation of the unit shown in FIG. 2, illustrating the physical placement of the components of the system.

As shown most clearly in FIGS. 2 and 3 the casing for the analyzer comprises an outside shell 50 which may be composed of sheet metal, plastic or any suitable material, the formation of which may be accomplished by a multitude of methods known to the prior art. The shell 50 is also equipped with a suitable carrying handle 51 and four supporting elements 52, two of which are shown in FIG. 3. The supporting elements 52 may comprise resilient support pads of a well known variety which are attached to the shell 50 by means of bolt members 53 or the like.

Mounting flanges 54 and 55 are secured to the front and rear portions respectively of the inside of the shell 50 and may be secured to the shell 50 by the same attaching means 53 which secure the supporting elements 52 to the shell. The mounting flanges 54 and 55 are in the form of continuous rings which have the shape of angle irons in cross section and include inwardly extending legs 56 and 57 which serve as supporting surfaces for the components to be mounted within the shell 50. The front flange 54 also serves as a means for attaching a front panel 58.

A rigid internal framing for the shell 50 is provided which comprises two horizontal angle members 59 at the top of the shell and identical horizontal members 60 at the bottom of the shell. Two vertical framing members 61 and 62 are located at either side of the rear portion of the casing, connected between the members 59 and 60, and two horizontal members 63 and 64 are located at the top and bottom of the rear portion of the shell and connected between the vertical members 61 and 62. Many variations may be made in the type of framing used for the interior of the shell 50 and that shown is by way of illustration only. The essential thing is to provide suitable mounting surfaces and rigid support members within the hollow shell 50. The framing described may be constructed by conventional means such as screw fastening means, spot welding or the like, as is well known in the art, with the frame members 59 and 60 being preferably permanently attached at their front ends to the panel 58.

Attached to the front face of the panel 58 is a cover element 65 which may be constructed from the same material as the casing 50, if desired, and which has a suitable configuration for mounting directly to the face of the panel 58 by a suitable fastening means such as rivets or bolts as shown in FIG. 3. The entire periphery of the cover 65 is sealed against the panel 58 by means of a gasket 66 as illustrated. The preferred form of mounting the cover and the panel 58 is shown in FIG. 3 and comprises screw fasteners 67 which permanently attach the cover to the panel 58 and fastening bolts 68 which fasten the cover and panel unit to the mounting flange 54. It will be understood that the front cover 65 is sealed about its entire periphery to the shell 50 by means of the mounting flange 54 and gasket 66 to form an air tight sealed unit.

A removable shell cover 69 is provided for protecting the element 65 and the components mounted thereon. The casing cover 69 may be hinged or latched to the casing 50 in any conventional manner not shown mith the rim 70 of the cover 69 snugly engaging the annular rim 71 of the casing 50. The outside casing cover 69 serves to protect the face of the unit during the times when the unit is being transported about or during storage.

Within the body of the casing 50, the components of the analyzer unit are arranged with the inlet header P and the return header R located at the rear wall of the casing 50 and secured to the casing 50 and to the frame member 64 by means of a mounting structure which includes an angle bracket 72 secured to the framing members 64 and a recessed receptacle 73, rigidly attached to the shell 50. Screw threaded locking nuts 74 serve to secure the headers P and R to the bracket 72 and the receptacle 73. The locking nuts 74 are arranged in such a manner that when they are removed, the internally mounted components, including the headers, may be removed from the casing 50. This relationship is shown most clearly in FIGURE 3.

Figure 4:
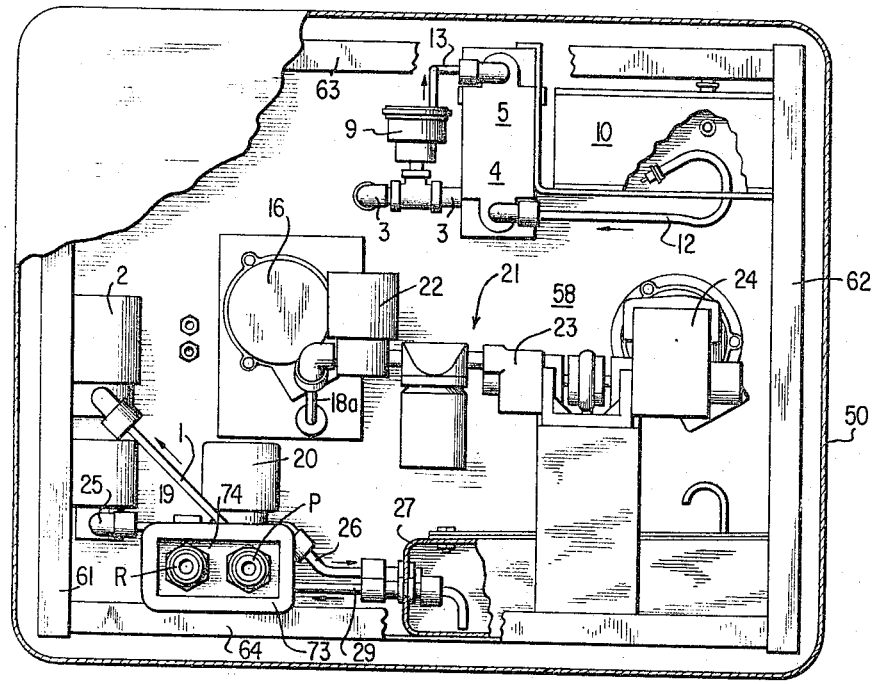
FIG. 4 is an elevational view looking from the backside of the unit with panels removed to show the placement of the various components.

Following the system as explained in connection with FIGURE 1, and utilizing the identical reference characters to identify the identical components, conduit 1, as seen in FIG. 4, extends from the header P to the solenoid valve 2 at the left side of the unit. From the valve unit 2 the conduit 3 extends through and is secured to the panel 58 to connect the valve 2 with the manually operated pressure valve 7 mounted on the cover 65 so as to be accessible to the operator. The overload pressure switch 9 is also located in the conduit 3, downstream of the valve 7. The conduit 3, between the valve 7 and the switch 9, extends along the underside of the cover 65 and is connected directly to the visual pressure gauge 8 which is also mounted on the cover 65. With this arrangement, the operator may keep close surveillance of the pressure within the system of the unit and readily control the same by means of the valve 7.

Figure 5:
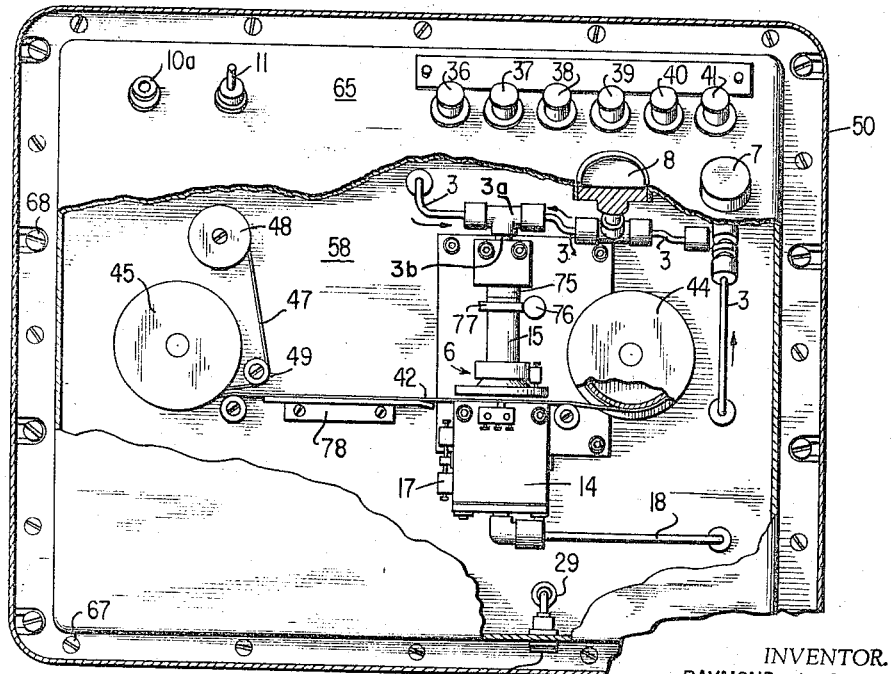
FIG. 5 is a front elevational view of the unit with the cover removed.

Between the gauge 8 and the switch 9 the conduit 3 is provided with a suitable T fitting 3a and then passes through the panel 58 in a rearward direction to the overload pressure switch 9 and the double solenoid valve unit 4, 5. The solenoid valve 4 serves to selectively connect the conduit 3 to the reagent tank 10 by means of a separate conduit 12. The reagent tank 10 may include an opening 10a conveniently mounted on the cover 65 as shown in FIGS. 2 and 5.

The solenoid valve 5 serves to selectively connect the conduit 3 to conduit 13 extending from the valve 5, through the panel 58 and directly to the air sampling inlet 11 mounted on the face of the cover 65.

It will be understood the solenoid valves 4 and 5 may both be closed with respect to the conduit 3 or may be operated to selectively connect either the air sample inlet 11 or the reagent tank 10 to the conduit 3.

The T fitting 3a is directly connected to the seal part 15 of the sample chamber assembly 6 by an inlet conduit 3b. As previously explained, the sample chamber assembly includes the sample tank 14 and a movable sealing element 15. The sealing element 15 is threadably received in a hollow cylindrical rotatable member 75 which is sealingly connected to the T fitting 3a. A worm gear 76, driven by the motor 16, engages a gear 77 carried by the cylindrical members 75, whereupon the sealing element 15 may be raised as shown in FIG. 5 or lowered to a sealing position in which the filter tape reel and a single filter pad will be clamped to the open top of the sample tank 14.

The sample tank 14, shown in FIG. 5, also includes a liquid level switching arrangement 17 mounted on the side of the tank. The function of the liquid level switch will be explained in connection with the operation of the entire system. From the bottom of the sample tank 14 a conduit 18 extends through the panel 58 and is provided with a suitable T fitting 78 shown in FIG. 3 with one branch of the conduit 18 being connected to the valve 19 and the other being connected to the valve 20.

The solenoid valve 20 as previously stated, is connected to the conduit 18 and also to the discharge conduit 26 for selectively controlling the flow of liquid to a sump tank 27. The sump tank 27 is connected to a suitable drain opening 28 in the bottom wall of cover 65 by means of the conduit 29. The remaining solenoid valve 19 which is also in registry with the conduit 18 is directly connected to the return header R by means of conduit 25.

To complete the system, the solenoid valve 22 is connected to sample tank 14 by means of conduit 18a which passes through the panel 58 and into the rear of the tank 14. The valve 22 may be operated to connect the vacuum 23 with the conduit 18a with the pump unit being driven by the motor 24.

According to the present invention, the fluid which is to be analyzed is subjected to a particle analysis technique which involves passing the liquid through a filter and then observing the filter for particle size measurement, density, etc. To accomplish this, a filter tape 42 is utilized which incorporates separate spaced filter pads 43, shown in FIGURE 2, which are indexed to a position within the sample chamber assembly and subsequently moved to a microscopic examination station and then stored for future reference.

Referring to FIGS. 2 and 5, the filter tape 42 is taken from a filter tape reel 44 mounted in back of the cover 65 on the panel 58. The filter pads 43 are moved first to a position between the sealing element 15 and the sample tank 14, at which time the sealing element 15 is actuated to seal the filter pad to the top of the tank 14 so as to place the filter pad within the flow line of the analyzer.

After the filter pad has been subjected to the flow of fluid to be analyzed, the pad is then moved to a position beneath the microscope 46. The viewing lens of the microscope is mounted on the cover 65 as shown in FIG. 2 in a position to view the filter pad after it has been located on the table or support 78. The exact details of the microscopic examination unit are not a part of the present invention and conventional microscope structure may be utilized as desired. The microscope is not shown in FIG. 5 because of difficulty of illustration, but the mounting arrangement will be clear from FIG. 2. If desired, microscope adjusting mechanism may be arranged so that knobs 79 and 80 can be mounted on the front portion of the cover 65 so as to be accessible by the operator.

The details of the cover 65 include a door 81 built into the cover on a vertical surface thereof. The door 81 is provided with a glass panel 82 so that the operator may readily observe the movement of the tape and filter pads within the unit along with the operation of the sealing element 15 and the tape reels.

After the filter pads 43 have been observed by means of the microscope 56, the tape is moved to the take-up reel 45 mounted on the left side of the panel 58 and driven by a suitable indexing motor, not shown. As the filter tape 42 is wound onto the take-up reel 45, a filter sealing web 47 contained on the reel 48 is also guided by means of the guide roller 49 onto the surface of the tape 42. The purpose of the sealing web 47 is to separate the contaminated filter pads 43 from contact with each other as they are stored on the take-up reel 45.

*Operation*

When it is desired to utilize the contamination analyzer of the present invention, the unit will be moved to the location of the particular fluid system which is to be analyzed. It will be understood that, with respect to any closed fluid system, the pressure header P is connected to an inlet line from the fluid system and the return header R will be connected to a return conduit of the fluid system. The electrical system of the analyzer may then be connected to any suitable power source such as inside power line or, if desired, the unit may be equipped with a separate portable power source such as electrical batteries. Initially, the solenoid valves are in the closed or de-energized positions so that the various conduits of the analyzer system are closed. The various motors and other electrical components of the system are also in a de-energized condition.

In analyzing the fluid of any particular system for contamination, it is first desirable to flush the analyzer unit of the present invention with the contaminated fluid of the system by allowing fluid from the tested system to circulate through the analyzer. This operation is referred to as the flush cycle which is initiated by the operator of the device by means of one of the control switches on the cover 65.

Upon initiation of the flush cycle, the solenoid valve 2 opens and fluid from the system is allowed to enter the analyzer unit. Simultaneously with the energization of the solenoid valve 2, the motor 16 is operated to move the sealing member 15 into sealing engagement with the sample tank 14 so as to close the sample chamber assembly. The solenoid valve 20 is energized so as to pass the fluid from the conduit 18 to the sump tank 27 and thence to the open drain 28. When the analyzer unit is sufficiently flushed with the fluid to be tested, the operator de-energizes the components of the unit by means of one of the manual switches and the unit is then ready to perform the sampling and analysis cycles which follow.

When it is desired to perform the sample cycle, the operator will initiate a control switch on the cover 65 to condition the time cycling circuit to perform the following functions to automatically sample the fluid and deposit the contamination on the filter. The solenoid valve 2 will be energized allowing the fluid from the system to enter the analyzer unit and at the same time the sealing member 15 will close to seal the filter tape and a filter pad to the sample tank. With solenoid valves 19 and 20 closed, the valve 22 will be energized and the vacuum pump 23 will be operated to draw the fluid into the sample tank. The liquid level switch 17 is now conditioned to control the volume of fluid to be collected in the sample tank 14.

Since the present analysis technique is based on a contamination level of particle size measurement per volume of fluid, the liquid level switch 17 is preset to allow a predetermined volume of fluid to be collected in the sample tank 14. Depending upon the type of fluid and the sensitivity of filtering or analysis required the filter pour size of the filter pads 43 can be varied. For example, absolute filtration rating filters with pour size range .22 micron to 10 microns are commercially available.

Once the predetermined volume of fluid has been collected in the tank 14, the liquid level switch 17 will de-energize the valve 2 to interrupt the flow of fluid entering the analyzer and also de-energize the solenoid valve 22 and the pump 23. The signal from the liquid level switch 17 will also energize solenoid valves 5 and 20 allowing the sample of fluid which has been collected to drain into the sump tank 27. When the fluid has been completely drained from the tank 14, a low level electrical contact of the switch 17 will de-energize the valve 5 and energize solenoid valve 4 allowing a reagent from the tank 10 to flow into the sample tank 14 thus flushing the particles and film which have been impinged on the filter surface. A repeat of the liquid level switch sequence will de-energize the circuits after the flushing by the reagent. A signal from the liquid level switch 17 is also used to index the filter pad 43 from the sample tank to the analysis section of the analyzer comprising the microscope 46. This indexing involves a raising of the sealing member 15 and energization of the tape reel 45 to move the filter tape.

The analysis operation is accomplished by the use of a standard microscope 46 which is utilized for focusing and scanning of the individual filter pads 43. It is understood, however, that electronic or other readout means could be adapted for the analysis operation.

After the analysis has been completed an indexing cycle may be initiated by the operator to index a new filter pad into position at the sample chamber 6 and to operate the motor 16 to reseal a clean filter surface automatically. As the filter tape 42 progresses, the contaminated filter elements are stored on the take-up reel 45 for future reference or record.

The present unit is also equipped for sampling air from the atmosphere or from a fabricated pneumatic system as well as other gaseous media. When the sample air cycle is initiated by the operator the solenoid valve 5 will be opened to allow an air sample to enter the inlet 11 and, at the same time, the solenoid valve 22 is opened to create a vacuum in the sample tank 14 by means of the vacuum pump 23. In the handling of a gaseous fluid the liquid level switch 17 would be replaced by a pressure responsive switch. The above described indexing cycles may be utilized to advance the individual filter elements from the sample chamber assembly 6 to the analysis position beneath the microscope 46 and thence to a stored position on the take-up reel 45.

It will be understood that many modifications and variations in the various components may be made without departing from the spirit and scope of the novel concepts of the present invention and applicant intends to be limited only to a liberal interpretation of the specification and claims.

Having thus described the details of the invention, what is claimed as new and novel and desired to be secured by Letters Patent is:

1. A fluid contamination analyzer comprising; a sealed self contained unit, said unit including a sample chamber assembly having a sample tank and a movable sealing element for said tank, an inlet conduit connected to said sealing element, a first inlet in said inlet conduit for admitting a liquid to said assembly, a second inlet in said inlet conduit for admitting a gas sample, a reagent tank inlet conduit connected to said inlet conduit, solenoid valve means for selectively controlling the flow of fluid from said first and second inlets and said reagent tank, a vacuum pump and valve assembly connected to said sample tank for selectively creating a vacuum induced fluid flow to said tank, a fluid outlet conduit connected to said sample tank, solenoid valve means for controlling the flow of fluid in said outlet conduit, a filter tape having individual spaced filter pads thereon, means for indexing said tape between said sealing element and said tank, whereby individual filter pads may be sequentially sealed between said element and said tank for exposure to and contamination by fluid admitted to said unit, microscopic analysis apparatus positioned adjacent to the sample chamber assembly for inspection of each of the contaminated filter pads after exposure to and contamination by the fluid, and electrical timed cycle control means for controlling the operation of said valves, said movable element and said indexing means.

2. The combination according to claim 1 wherein, said inlet conduit is provided with a fluid pressure gauge and a manually operated flow control valve for monitoring the flow of fluid in said conduit, and a fluid pressure sensitive control switch in said conduit for deenergizing said solenoid valve means when the pressure within said conduit reaches a predetermined maximum.

3. A fluid contamination analyzer comprising a sealed portable unit, said unit including means for admitting and conveying a fluid to be analyzed therethrough, a filter tape mounted in said unit including individual spaced filter pads, a sample chamber assembly for selectively passing the fluid through said filter pads and collecting a sample of said fluid, means adjacent the sample chamber assembly for inspecting each contaminated filter after the fluid has been passed therethrough and a sample of it collected, means for indexing the filter pads to said sample chamber assembly and subsequently to said inspection means, and electrical time cycle control means for controlling the operations of said unit, the unit further including an inlet conduit connected to said sample chamber assembly, a first inlet in said inlet conduit for admitting a liquid to said sample chamber, and second inlet in said inlet conduit for admitting a gas sample, a reagent tank connected to said inlet conduit, and solenoid valve means controlled by said electrical time cycle control means for selectively admitting a fluid through said first inlet, or said second inlet or admitting reagent fluid from said reagent tank.

4. A sealed portable fluid contamination analyzer unit comprising means for admitting and conveying a fluid to be analyzed therethrough, a filter tape mounted in said unit including individual spaced filter pads, a sample chamber assembly for selectively passing the fluid to said filter pads and collecting a sample of said fluid thereon, means adjacent said sample chamber assembly for inspecting each individual filter after it has been contaminated by the passage of fluid therethrough, means for indexing individual filter pads to said sample chamber assembly and subsequently to said inpection means, and electrical time cycle control means for controlling the operation of said unit, said means for indexing said filter tape including a filter tape feed-out reel, a motor driven take-up reel controlled by said indexing means for advancing said filter tape through said sample chamber and said inspection means and storing said filter tape, and means adjacent said take-up reel for delivering a sealing web into engagement with the surface of said filter tape, said sealing web being wound onto the take-up storage reel and separating the filter pads of the filter tape from each other as they are wound thereon.

5. In a fluid contamination unit having means for admitting and conveying a fluid, a filter tape including individual spaced filter pads, means for passing the fluid through the filter pads, means for microscopic analysis of said filter pads after contamination, and means for storing said filter pads for record purposes, a portable self contained housing for said analyzer unit comprising; a hollow cubical shell having one open side thereof defined by a rectangular rim, a continuous annular flange having an inwardly extending leg secured to the inside surface of said shell adjacent said rim, a closure panel having front and rear mounting surfaces secured to said inwardly extending leg for mounting the components of said unit, inlet and outlet headers mounted in the surface of said shell, a removable cover member, said cover having a plane surface continuous edge portion in sealing engagement with the peripheral edge of the front side of said panel, said filter tape and said means for storing said tape being mounted on the front side surface of said panel, said microscopic analysis means located in said cover, and a transparent section included in said cover positioned to allow visual inspection of said filter tape, a drain opening in said cover to accommodate a drain conduit of said unit, and control means for said unit mounted on the surface of said cover.

References Cited by the Examiner

UNITED STATES PATENTS

| | | | |
|---|---|---|---|
| 2,026,267 | 12/1935 | Brandlin | 73—61 X |
| 2,734,377 | 2/1956 | Traver | 73—53 |
| 3,138,015 | 6/1964 | Avery | 73—61 |
| 3,167,949 | 2/1965 | Stenzel et al. | 73—61 X |
| 3,232,094 | 2/1966 | Teschner | 73—28 |

DAVID SCHONBERG, *Primary Examiner.*